(12) United States Patent
Othman

(10) Patent No.: US 12,497,585 B2
(45) Date of Patent: Dec. 16, 2025

(54) CO2 INCUBATOR DEVICE AND A CLOUD-BASED SYSTEM THEREOF

(71) Applicant: Shadi Othman, Sacramento, CA (US)

(72) Inventor: Shadi Othman, Sacramento, CA (US)

( * ) Notice: Subject to any disclaimer, the term of this patent is extended or adjusted under 35 U.S.C. 154(b) by 736 days.

(21) Appl. No.: 17/849,871

(22) Filed: Jun. 27, 2022

(65) Prior Publication Data

US 2023/0193186 A1 Jun. 22, 2023

Related U.S. Application Data

(60) Provisional application No. 63/292,484, filed on Dec. 22, 2021.

(51) Int. Cl.
| | | |
|---|---|---|
| *C12M 1/00* | (2006.01) | |
| *C12M 1/34* | (2006.01) | |
| *C12M 1/36* | (2006.01) | |
| *C12M 3/00* | (2006.01) | |

(52) U.S. Cl.
CPC ............ *C12M 41/14* (2013.01); *C12M 23/48* (2013.01); *C12M 41/34* (2013.01); *C12M 41/48* (2013.01)

(58) Field of Classification Search
CPC ...... C12M 23/44; C12M 23/48; C12M 41/14; C12M 41/34; C12M 41/48
See application file for complete search history.

(56) References Cited

U.S. PATENT DOCUMENTS

2021/0032587 A1 * 2/2021 Lim .................. C12M 27/16

FOREIGN PATENT DOCUMENTS

| JP | 4473711 B2 * | 6/2010 | ............ C12M 41/14 |
| JP | 2018511338 A * | 4/2018 | ............. C12N 15/87 |

* cited by examiner

*Primary Examiner* — Lydia Edwards
(74) *Attorney, Agent, or Firm* — Brennan, Manna & Diamond, LLC

(57) ABSTRACT

The present invention relates to a CO2 incubator device and a cloud system connecting the CO2 incubator device with a cloud server. The device includes a plurality of removable incubation unit trays wherein each tray acts as a separate incubator and individual bioreactor. The device includes an inlet valve and an outlet valve for each tray for inflow and outflow of CO2 gas. A microprocessor is coupled to a microcontroller for controlling temperature and CO2 level in the trays based on excess CO2 level present in the trays. A cloud server is connected to the device using a communication protocol for enabling the microprocessor to transmit incubator data to the server and to modify the incubation conditions. The data is stored in a cloud database for enabling users to remotely access the incubator data. The multiple trays are accessed independently enabling multiple users to interact with the incubator.

13 Claims, 8 Drawing Sheets

CO2 INCUBATOR DEVICE AND A CLOUD-BASED SYSTEM THEREOF

CROSS-REFERENCE TO RELATED APPLICATION

The present application claims priority to, and the benefit of, U.S. Provisional Application No. 63/292,484, which was filed on Dec. 22, 2021 and is incorporated herein by reference in its entirety.

FIELD OF THE INVENTION

The present invention relates generally to the field of research and educational incubator devices. More specifically, the present invention relates to a novel carbon dioxide ($CO_2$) incubator device that has multiple independent incubation trays enabling multiple users to interact with the incubator simultaneously for minimizing cross-contamination. The device is also configured to connect to a cloud server enabling individuals to remotely access and modify the configuration and parameters of the incubator device. Accordingly, the present disclosure makes specific reference thereto. Nonetheless, it is to be appreciated that aspects of the present invention are also equally applicable to other like applications, devices, and methods of manufacture.

BACKGROUND OF THE INVENTION

By way of background, incubators and especially $CO_2$ incubators are used for holding samples containing materials, including micro-objects and other components derived from biological cells. Incubators are designed to provide conditions to maintain the viability of biologically related materials. For example, the interior environment of the incubator can have a certain temperature range, humidity, and carbon dioxide content selected to maintain the viability of the materials. Incubators are widely used by researchers for biological research.

In use, the materials kept within the incubator are accessed by opening the incubator. For accessing information such as temperature, air pressure, humidity, gas level, and others, typically a person has to be physically present in front of the incubator. This is not only cumbersome but also not always possible for an individual. In cases, where an individual is not physically present, various readings regarding the stored materials are missed and can be detrimental for the analysis and research. Individuals desire a novel incubator that enables individuals to remotely control and access the materials stored inside the incubator for easy access.

In conventional incubators, a single lid or door is provided that enables a single person to interact with the incubator. Further, opening the incubator, such as by opening a lid of the incubator, can introduce contaminants in all the stored materials and disrupt the interior environment of the incubator. Further, in situations of multiple users using a single incubator, the door can be repeatedly opened wherein the repeated opening can adversely affect the biological viability of the materials within the incubator. Therefore, individuals desire an improved incubator that provides multiple small and independent incubators enabling multiple individuals to interact with the incubator independently and simultaneously.

Therefore, there exists a long felt need in the art for an incubator device that enables multiple users to interact with the $CO_2$ incubator device. There is also a long felt need in the art for an improved incubator device that provides multiple small and independent incubators. Additionally, there is a long felt need in the art for an improved $CO_2$ incubator device that reduces cross-contamination between materials stored and varying operational procedures between different users which can be caused by the opening of the incubator device. Moreover, there is a long felt need in the art for an incubator device that obviates the need of an individual to be physically present in front of the incubator for accessing the stored materials. Further, there is a long felt need in the art for an incubator device that enables individuals to remotely control and access properties and configurations of the incubator. Finally, there is a long felt need in the art for an improved $CO_2$ incubator device that is easy to access, can be accessed by multiple individuals remotely, and securely stores all the incubator data securely.

The subject matter disclosed and claimed herein, in one embodiment thereof, comprises a $CO_2$ incubator device. The $CO_2$ incubator device further comprising a housing providing a sealed enclosure for supporting controlled cell culture environment; the housing including a plurality of independent removable incubation trays, wherein each tray is configured to function as an independent incubator and includes a separate door; a heater and a temperature sensor positioned underneath each tray for maintaining temperature of the tray; each tray having an individual one-way inlet valve and one-way outlet valve; a $CO_2$ chamber for providing $CO_2$ to each tray through the corresponding inlet valve; a $CO_2$ sensor chamber with an integrated $CO_2$ sensor for receiving excess $CO_2$ from each tray through the corresponding outlet valve of the tray; a microcontroller is configured to control the $CO_2$ level in each tray when the $CO_2$ level detected by the $CO_2$ sensor deviates from an optimal 3-7% $CO_2$ level of the incubator device wherein the microcontroller is configured to individually control the $CO_2$ level of each tray. A cloud server receives incubator data from the microprocessor and microcontroller for storage enabling individuals to remotely access the data.

In this manner, the $CO_2$ incubator device of the present invention accomplishes all of the forgoing objectives and provides users with an improved incubator that provides a plurality of separate and independent incubation trays that provide independent storage space for controlled cell culture. The incubator is also connected to a cloud server and includes a microprocessor for automatically controlling temperature and $CO_2$ level of individual trays.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a $CO_2$ incubator device. The $CO_2$ incubator device further comprising a housing providing an enclosure for supporting controlled cell culture environment; the housing including a plurality of removable incubation trays, wherein each tray is configured to function as an independent incubator; a heater and a temperature sensor positioned underneath each tray for maintaining temperature of the tray; each tray having an individual one-way inlet valve and one-way outlet valve; a $CO_2$ chamber for providing CO2 to each tray through the corresponding inlet valve; a CO2 sensor chamber with an integrated CO2 sensor for receiving excess CO2 from each tray through the corresponding outlet valve of the tray; a microcontroller is configured to control the CO2 level in each tray when the CO2 level detected by the CO2 sensor deviates from an optimal 3-7% CO2 level of the incubator device wherein the microcontroller is configured to individually control the CO2 level of each tray.

In yet another embodiment, each tray includes a transparent and latching front door.

In yet another embodiment, each tray is accommodated in a frame disposed inside the device.

In yet another embodiment, each tray acts as a separate incubator and individual bioreactor.

In yet another embodiment, the trays are made from a non-rusting material such as, but not limited to stainless-steel, polycarbonate, or copper that can withstand high temperatures and autoclaving to minimize contamination risk.

In yet another embodiment, a CO2 incubation system is disclosed. The CO2 incubation system includes a portable CO2 incubator device, a cloud-based server having an integrated database wherein the incubator device and the server are coupled through an IoT based communication protocol for exchanging information; the device further comprising a plurality of incubation trays configured to be removably and independently accessible in the device; a microprocessor for controlling temperature and CO2 in each tray for controlling cell culture environment; a CO2 chamber for providing CO2 to each tray and a CO2 sensor for detecting optimal CO2 level in the trays; the microprocessor is further configured to transmit data gathered from each incubator tray to the server using the communication protocol, wherein the database is configured to store the received data for access by users using a dashboard.

In yet another embodiment, a CO2 incubator device is disclosed. The device has a generally rectangular body that is further comprising of a sealed interior with a plurality of removable incubation unit trays. The sealed interior is configured to provide a constant internal atmosphere that remains unaffected by external factors. Each tray has a one-way inlet solenoid valve for receiving CO2 from a CO2 chamber and a one-way outlet solenoid valve for ejecting CO2 to a CO2 sensor chamber, a microprocessor coupled to a microcontroller is configured to control the temperature and CO2 level for each tray and to store temperature, CO2 levels, and humidity of each tray, wherein the microprocessor either triggers the release, or halts the supply, of CO2 to the device when a CO2 sensor integrated in the CO2 sensor chamber detects a value other than optimal 3-7% CO2 level in the system.

In yet another embodiment, a CO2 tank is used for providing CO2 to the CO2 chamber through a gas flow meter wherein the gas flow meter is used for controlling air pressure inside the chamber.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents.

Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
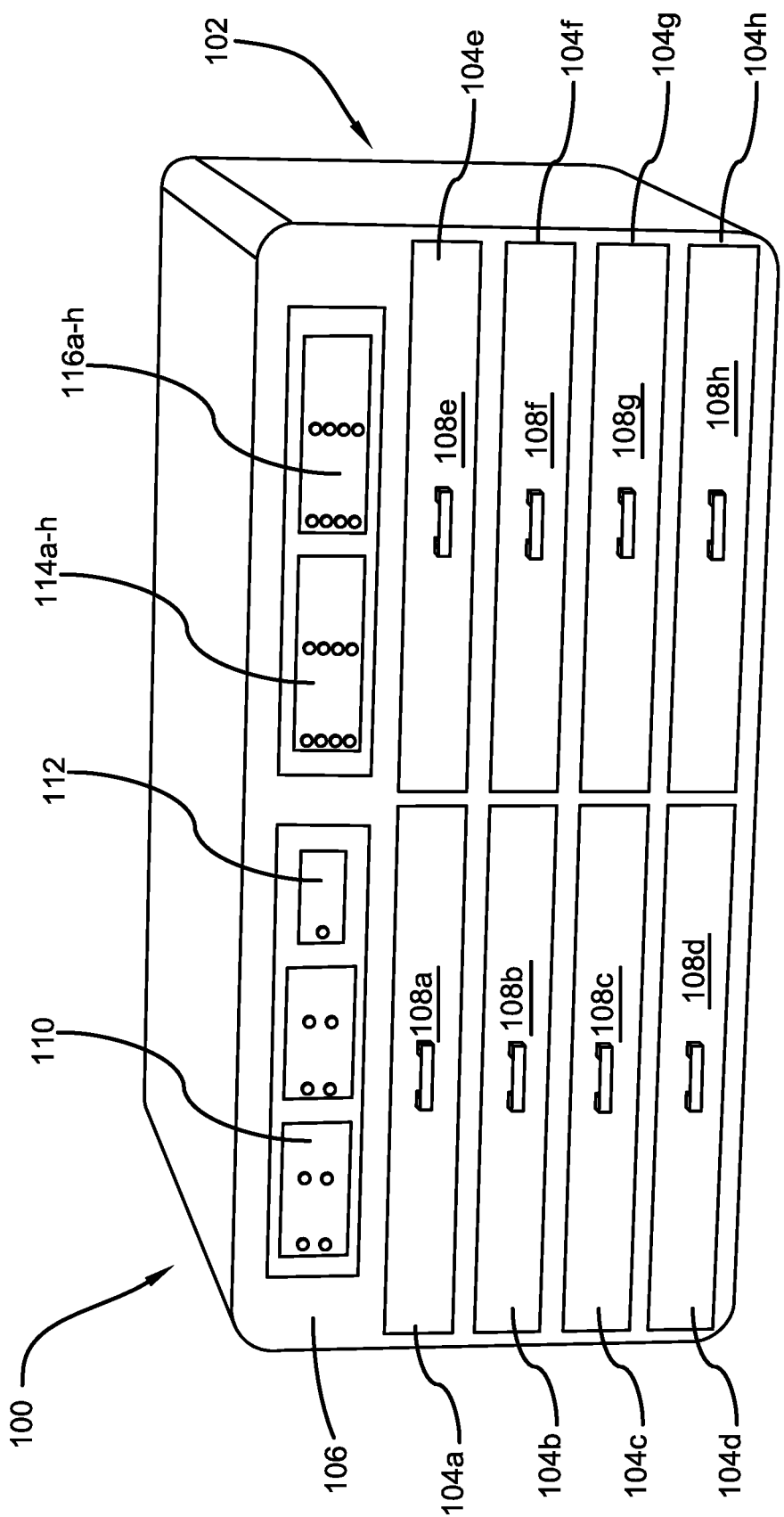
FIG. 1 illustrates a front perspective view of one potential embodiment of a CO2 incubator device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long felt need in the art for an incubator device that enables multiple users to interact with the CO2 incubator device. There is also a long felt need in the art for an improved incubator device that provides multiple small and independent incubators. Additionally, there is a long felt need in the art for an improved CO2 incubator device that reduces cross-contamination between materials stored which can be caused by the opening of the incubator device. Moreover, there is a long felt need in the art for an incubator device that obviates the need of an individual to be physically present in front of the incubator for accessing the stored materials. Further, there is a long felt need in the art for an incubator device that enables individuals to remotely control and access properties and configurations of the incubator. Finally, there is a long felt need in the art for an improved CO2 incubator device that is easy to access, can be accessed by multiple individuals remotely, and securely stores all the incubator data securely.

The present invention, in one exemplary embodiment, is a CO2 incubation system. The CO2 incubation system includes a portable CO2 incubator device, a cloud-based server having an integrated database wherein the incubator device and the server are coupled through an IoT based communication protocol for exchanging information; the device further comprising a plurality of incubation trays configured to be removably and independently accessible in the device; a microprocessor for controlling temperature and CO2 in each tray for controlling cell culture environment; a CO2 chamber for providing CO2 to each tray and a CO2 sensor for detecting optimal CO2 level in the trays; the microprocessor is further configured to transmit data gathered from each incubator tray to the server using the communication protocol, wherein the database is configured to store the received data for access by users using a dashboard.

Referring initially to the drawings, FIG. 1 illustrates a front perspective view of one potential embodiment of the CO2 incubator device 100 of the present invention in accordance with the disclosed architecture. CO2 incubator device 100 of the present invention is designed to enable a plurality of users or researchers to interact and work with the incubator. The incubator device 100 is also configured to be controlled remotely by a user as described later in the disclosure. More specifically, the incubator device 100 has a generally rectangular frame body 102 that includes a plurality of removable incubation unit trays 104a-h. Each incubation tray is accessible from the front surface 106 of the frame body 102 and includes a transparent and latching front door 108 for protecting the items/tissue stored therein. The transparent front doors 108a-h enable users to view the stored items without opening the door and access the incubation tray.

The interior space of the frame body 102 and the plurality of the incubation trays 104a-h are preferably manufactured from a rust-resistant material such as, but not limited to stainless steel, polycarbonate, or copper. The material of the trays 104a-h has additional properties of withstanding high temperatures and autoclaving for minimizing contamination risks. Each tray of the plurality of incubation trays 104a-h is separate and removable. Further, each tray acts as a separate incubator and individual bioreactor enabling the incubator device 100 to be used by a plurality of researchers.

The CO2 incubator device 100 is configured to provide contamination control and optimal growing conditions and experimental reproducibility for most demanding cell cultures and lab requirements. The front surface 106 has an iCAN touchscreen display 110 for displaying device parameters including but not limited to CO2 level, temperature, and other data outputs. A power button 112 is provided for turning on and off the device 100 as per preferences of users. For individual incubation trays 104a-h, a corresponding inlet valve button is provided and a corresponding outlet valve button is also provided. As illustrated, as an example, there are eight trays positioned in the incubator device 100, therefore, eight inlet valve control buttons 114a-h and eight outlet valve control buttons 116a-h are provided on the frame body 102. Each inlet and outlet button are coupled to an individual tray enabling users to selectively operate their incubation tray. It is to be appreciated that any number of trays can be provided.

Figure 2:
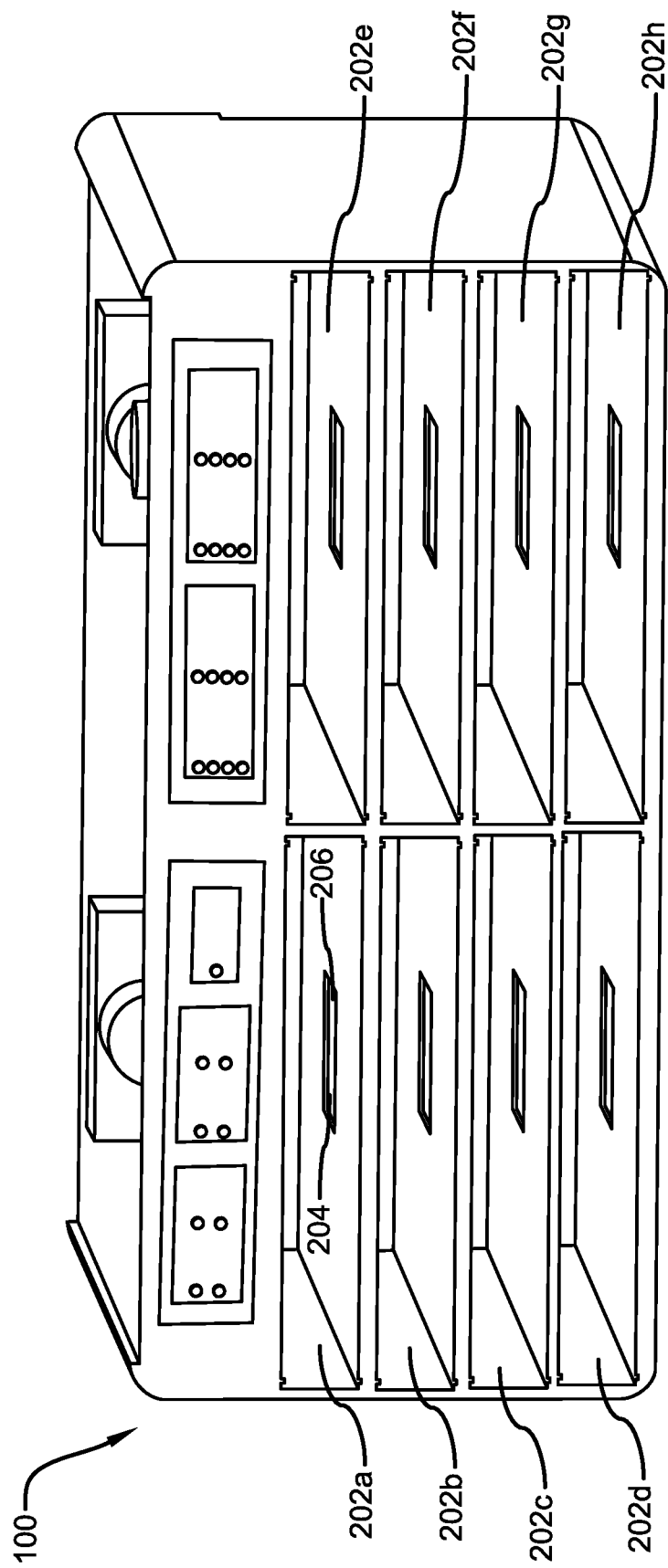
FIG. 2 illustrates a front perspective view of the CO2 incubator device of the present invention without the incubation trays in accordance with the disclosed architecture.

FIG. 2 illustrates a front perspective view of the CO2 incubator device 100 of the present invention without the incubation trays in accordance with the disclosed architecture. The incubation trays 104a-h are modular, separate, and function as individual incubators or bioreactors. The device 100 has a frame section for each tray enabling the tray to be easily inserted and removed from the frame. The frame sections 202a-h are integrated inside the device 100 and provide necessary CO2 and other environmental conditions required for the incubation.

Underneath each incubation tray, a heater 204 and a temperature sensor 206 is positioned. Specifically, the heater 204 and the temperature sensor 206 are disposed on the corresponding frame and are configured to work individually for the tray underneath which they are positioned. The heater 204 and the sensor 206 can be embedded as a single unit in a single chip or can be designed as two separate sensors/units. The temperature sensor 206 is configured to continuously monitor temperature of the corresponding incubation tray and based on the detected temperature, the heater 204 adjusts the temperature of the tray for providing optimum temperature for incubation.

The CO2 is provided by the CO2 pump positioned in the device 100 as described later in the disclosure. Further, for maintaining optimum CO2 level in each tray inlet valves and outlet valves are provided at the rear of the device as described in FIG. 3.

Figure 3:
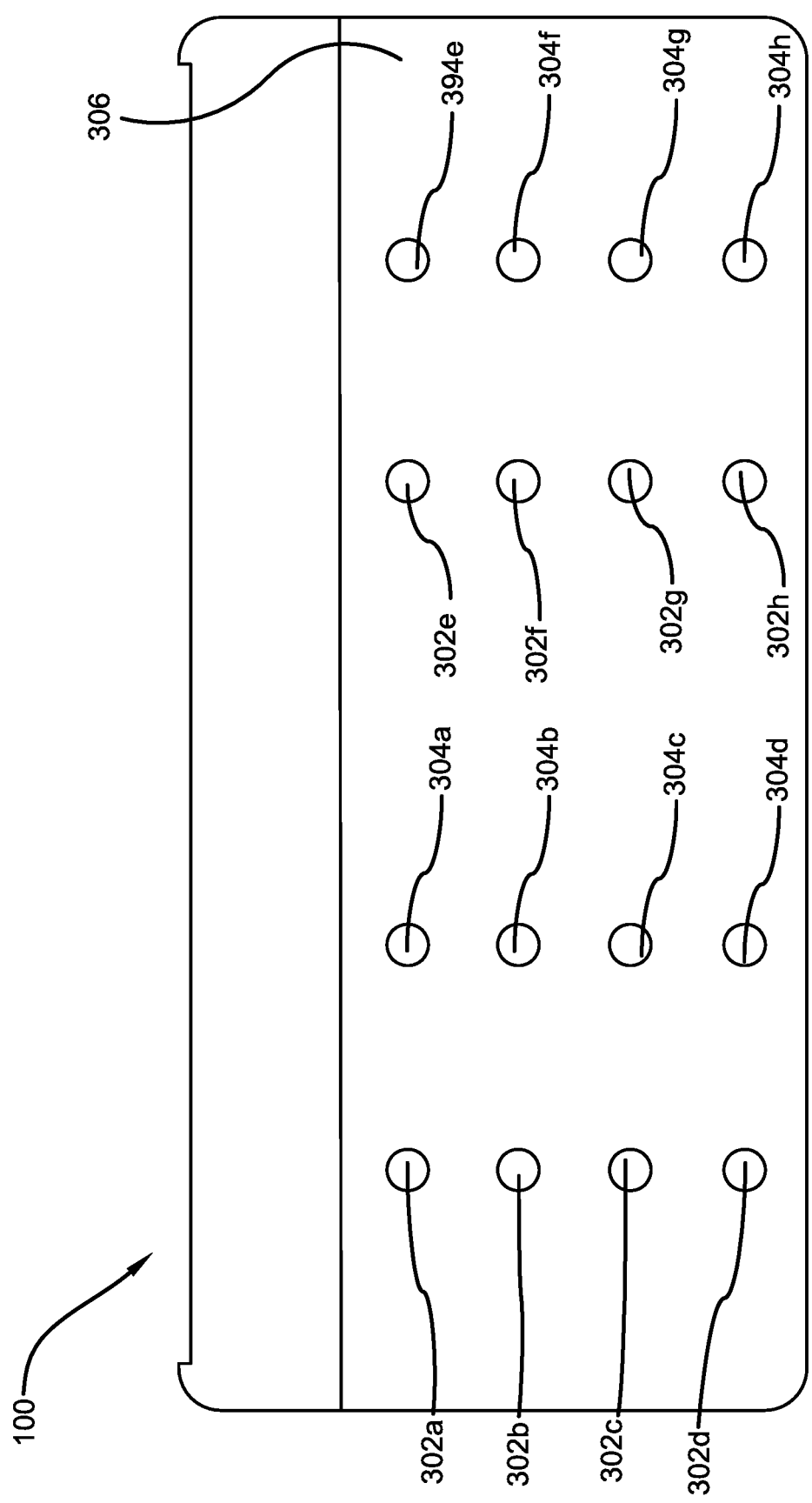
FIG. 3 illustrates a rear perspective view of the CO2 incubator device of the present invention in accordance with the disclosed architecture.

FIG. 3 illustrates a rear perspective view of the CO2 incubator device 100 of the present invention in accordance with the disclosed architecture. Each incubation tray of the device 100 has a pair of valves including an inlet valve and an outlet valve for adjusting the internal conditions of the tray to control the cell culture environment. Further, the valves of an individual tray enable the independent control of internal environment of the tray without having to interact with the environment of other trays of the device. Each valve is in the form of an opening disposed in the rear surface 306 of the incubator device 100. Further, each valve is a one-way mechanically operated solenoid valve that provides only unidirectional flow of the CO2 gas therethrough.

The inlet valve 302a is configured to receive CO2 gas from a CO2 chamber (shown in FIG. 5) positioned inside the device 100 and the received CO2 gas flows into the tray 104a. The outlet valve 304a is configured to facilitate flow of CO2 gas out of the tray 104a into a CO2 sensor chamber (shown in FIG. 5). Therefore, the inlet valve 302a and the outlet valve 304a together maintain the level of CO2 gas in the tray 104a for controlling the cell culture environment. Similarly, each pair of the other inlet valve and outlet valve are configured to independently inflow and outflow CO2 gas in the corresponding incubation trays for controlling cell culture environment.

As exemplary connections in the present embodiment, the inlet valve 302a and outlet valve 304a are configured to independently inflow and outflow CO2 respectively for the tray 104a; the inlet valve 302b and outlet valve 304b are configured to independently inflow and outflow CO2 for the tray 104b; the inlet valve 302c and outlet valve 304c are configured to independently inflow and outflow CO2 respectively for the tray 104c; the inlet valve 302d and outlet valve 304d are configured to independently inflow and outflow CO2 respectively for the tray 104d; the inlet valve 302e and outlet valve 304e are configured to independently inflow and outflow CO2 respectively for the tray 104e; the inlet valve 302f and outlet valve 304f are configured to independently inflow and outflow CO2 respectively for the tray 104f; the inlet valve 302g and outlet valve 304g are configured to independently inflow and outflow CO2 respectively for the tray 104g; and, the inlet valve 302h and outlet valve 304h are configured to independently inflow and outflow CO2 respectively for the tray 104h.

Figure 4:
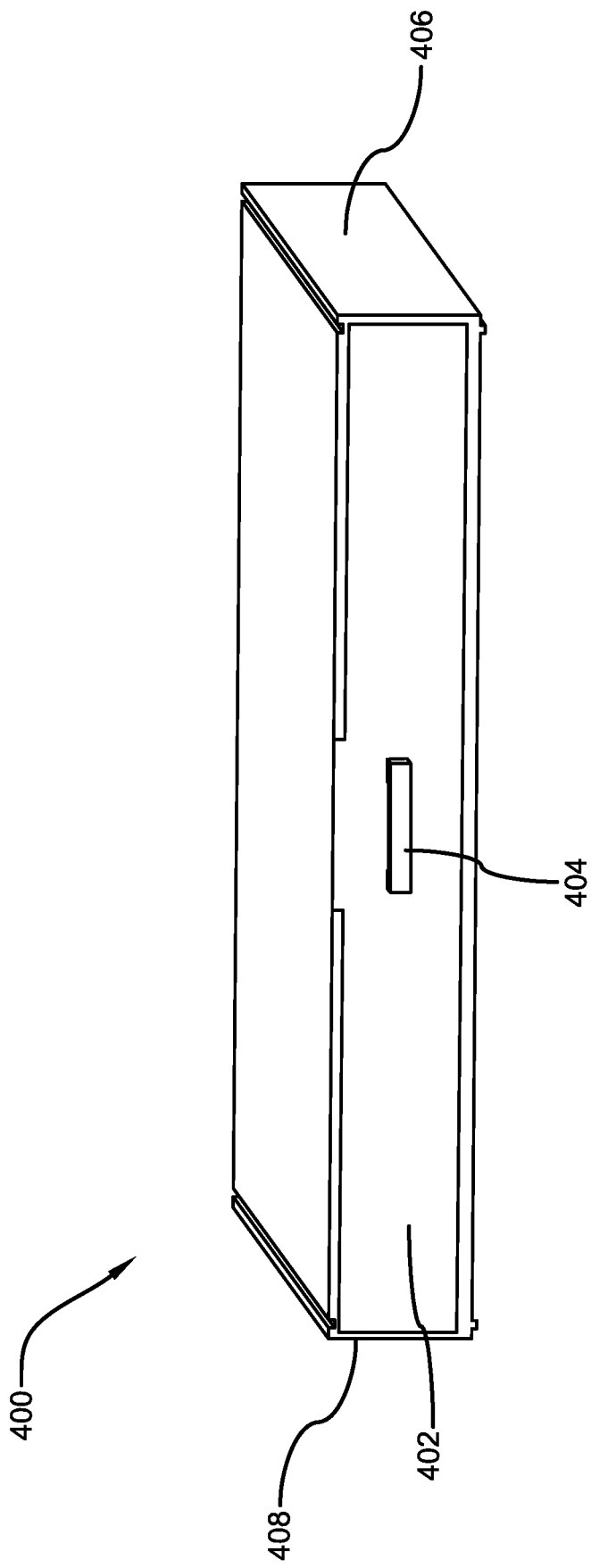
FIG. 4 illustrates a perspective view an individual incubation tray used as an independent incubator in the CO2 incubator device of the present invention in accordance with the disclosed architecture.

FIG. 4 illustrates a perspective view of an individual incubation tray used as an independent incubator in the CO2 incubator device 100 of the present invention in accordance with the disclosed architecture. Each individual incubation tray used in the device 100 is of the same size and shape and is configured to fit into a frame disposed in the device as illustrated in FIG. 2. The exemplary tray 400 embodies any of the trays used in the device 100, is generally cuboidal in shape and is configured to store cells, tissues, and more for providing controlled cell culture environment.

The tray 400 has a clear and transparent front latch door 402 that can be latched using the latch 404 for accessing the items stored in the tray 400. The sides 406, 408 of the tray provide channels for enabling tray 400 to be easily inserted and removed from the corresponding frame or frame section disposed in the device 100. It should be noted that the size and configuration of the tray 400 be designed as per the size of the device 100 and requirement of the storage space in the tray. The tray 400 is made of lightweight and corrosion free material that also eliminates contamination.

Figure 5:
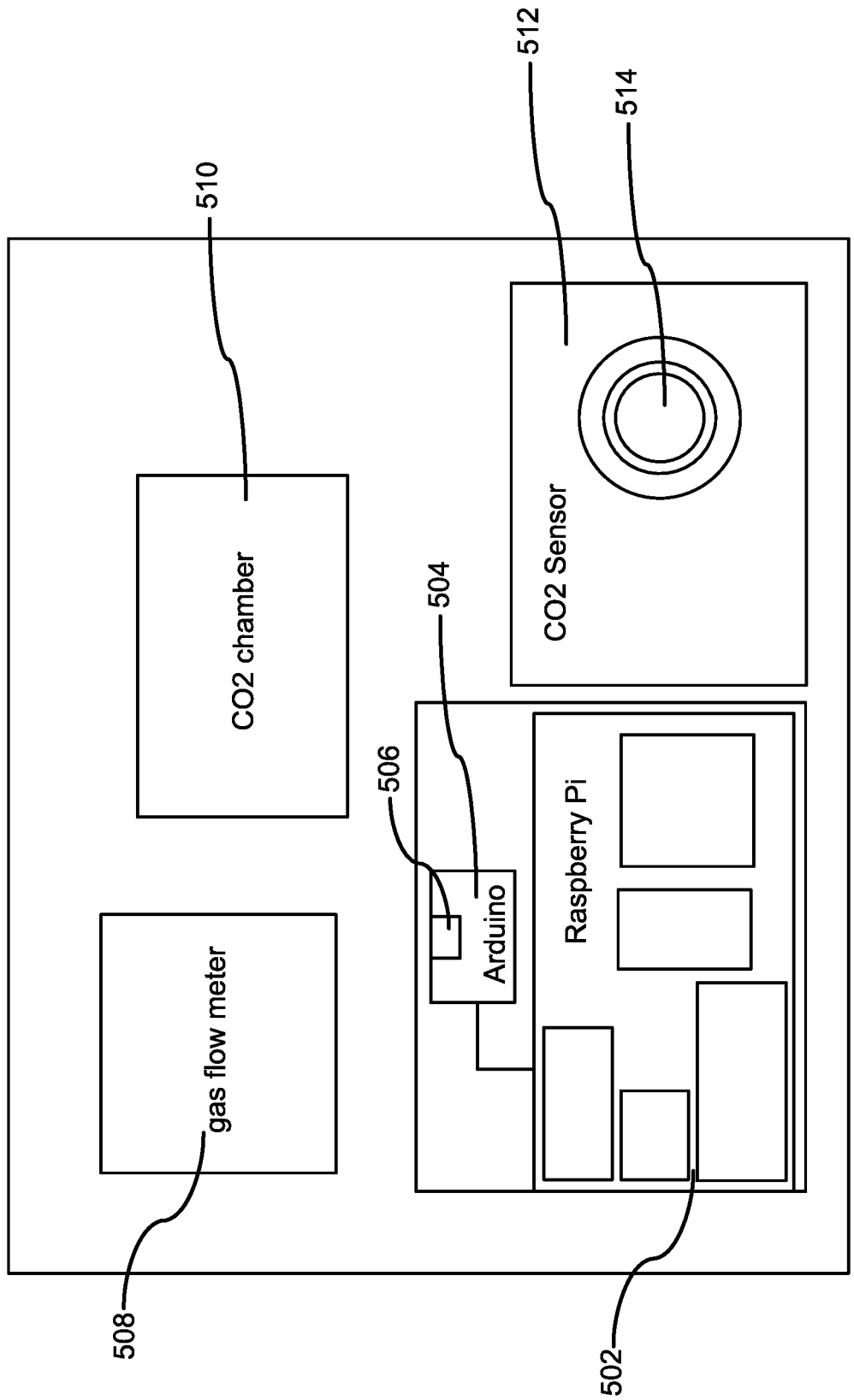
FIG. 5 illustrates a top view of the CO2 incubator device of the present invention showing the functional components for controlling CO2 level in accordance with the disclosed architecture.

FIG. 5 illustrates a top view of the CO2 incubator device of the present invention showing the functional components for controlling CO2 level in accordance with the disclosed architecture. The CO2 incubator device 100 includes at least one microprocessor 502 used for controlling temperature and carbon dioxide level in each incubation tray. In one exemplary embodiment, the microprocessor 502 is a Raspberry Pi Singe-Board computer equipped with open-source codes and a default reset feature. The microprocessor 502 is further comprised of a plurality of pin outputs, sources, and stored source code functions for operating and controlling the incubator device 100.

A microcontroller 504 such as an Arduino microcontroller is coupled to the microprocessor such as a Raspberry Pi which enable the users ease of access and configuration of the incubator including transforming a tray into the microprocessor or bioreactor 502. The microcontroller 504 provides the additional processing capabilities to the microprocessor 502 and the inputs including temperature and carbon dioxide level in each incubation tray are transmitted to the microprocessor 502 via the microcontroller 504. The microcontroller 504 helps in synchronization of monitoring of individual tray and further reduces the delay in transmission of input information. The microcontroller 504 may have an embedded Analog-to-Digital converter (ADC) chip 506 that enables the microprocessor 502 and/or the microcontroller 504 to be used as a slave device. Further, the built-in ADC chip 506 enables the device 100 to digitize analog input signals for digital processing.

A gas flow meter 508 is disposed inside the device 100 for regulating air flow inside the device. The CO2 from an outside CO2 tank is received by the gas flow meter 508 and helps in regulating the air pressure inside the device 100. The meter 508 can be pre-configured at a threshold air pressure level at which the CO2 level is desired. A global CO2 chamber 510 is coupled to the gas flow meter 508 and the CO2 from the gas flow meter 508 flows into the CO2 chamber 510. The global CO2 chamber 510 is the source for providing CO2 gas to the plurality of incubation trays via corresponding inlet valves. The CO2 gas deviates into, for example, eight separate directions to facilitate inflow into the trays.

A CO2 sensor chamber 512 includes a CO2 sensor 514 and is configured to measure the global CO2 level of the incubator device 100. The CO2 sensor 514 senses the level of CO2 based on the received excess CO2 from the incubation trays as discussed in FIG. 6. Multiple CO2 sensors can be connected to enhance the precision of CO2 measurement for a specific tray if needed. It should be noted that the CO2 sensor 514, microprocessor 502, and the microcontroller 504 are electrical components and can be coupled to each other using any conventional wired or wireless circuit.

Figure 6:
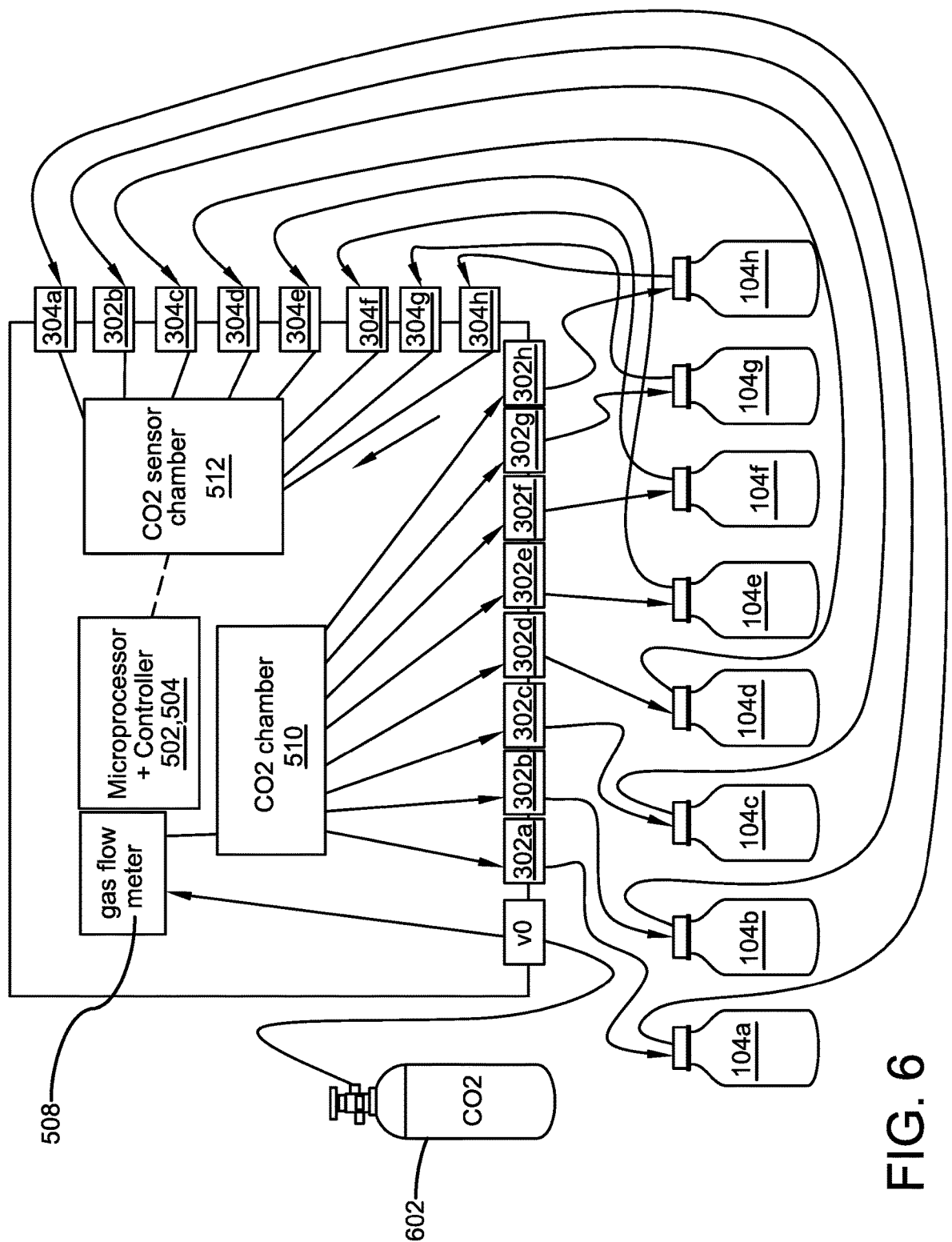
FIG. 6 illustrates a top view of the incubator device 100 of the present invention showing the inflow and outflow connections for CO2 in accordance with the disclosed architecture.

FIG. 6 illustrates a top view of the incubator device 100 of the present invention showing the inflow and outflow connections for CO2 in accordance with the disclosed architecture. It should be noted that the inlet valve and outlet valve corresponding to each tray are positioned separately for simplified representation but the valves are placed at the rear surface of the device 100 as illustrated in FIG. 3. A CO2 tank 602 is used for providing CO2 gas to the incubator device 100 and CO2 flows from the tank 602 to the gas flow meter 508 through a one-way valve "v0". After regulating air flow inside the device 100, CO2 gas flows from the gas flow meter 508 to the global CO2 chamber 510. Based on CO2 requirements of the trays 104-h, the CO2 flows into, for example, 8-ways to enable carbon dioxide to enter the trays 104a-h through eight separate one-way mechanically operated solenoid valves 302a-h.

The trays 104a-h release excess carbon dioxide stored in them through the second set of eight individual one-way valves 304a-h, which are brought together to create a singular path for the carbon dioxide to flow into the chamber 512 containing the CO2 sensor 514. The CO2 reaches the CO2 sensor 514 and is used for measuring the global CO2 level of the incubator 100 and in situations where the detected CO2 level by the sensor 514 deviates from the pre-determined optimal 3-7% CO2 level of the incubator 100, the microprocessor 502 either triggers the release, or halts the supply, of CO2 to the incubator system 100 to reach equilibrium and maintain the desired CO2 level in the individual trays.

Figure 7:
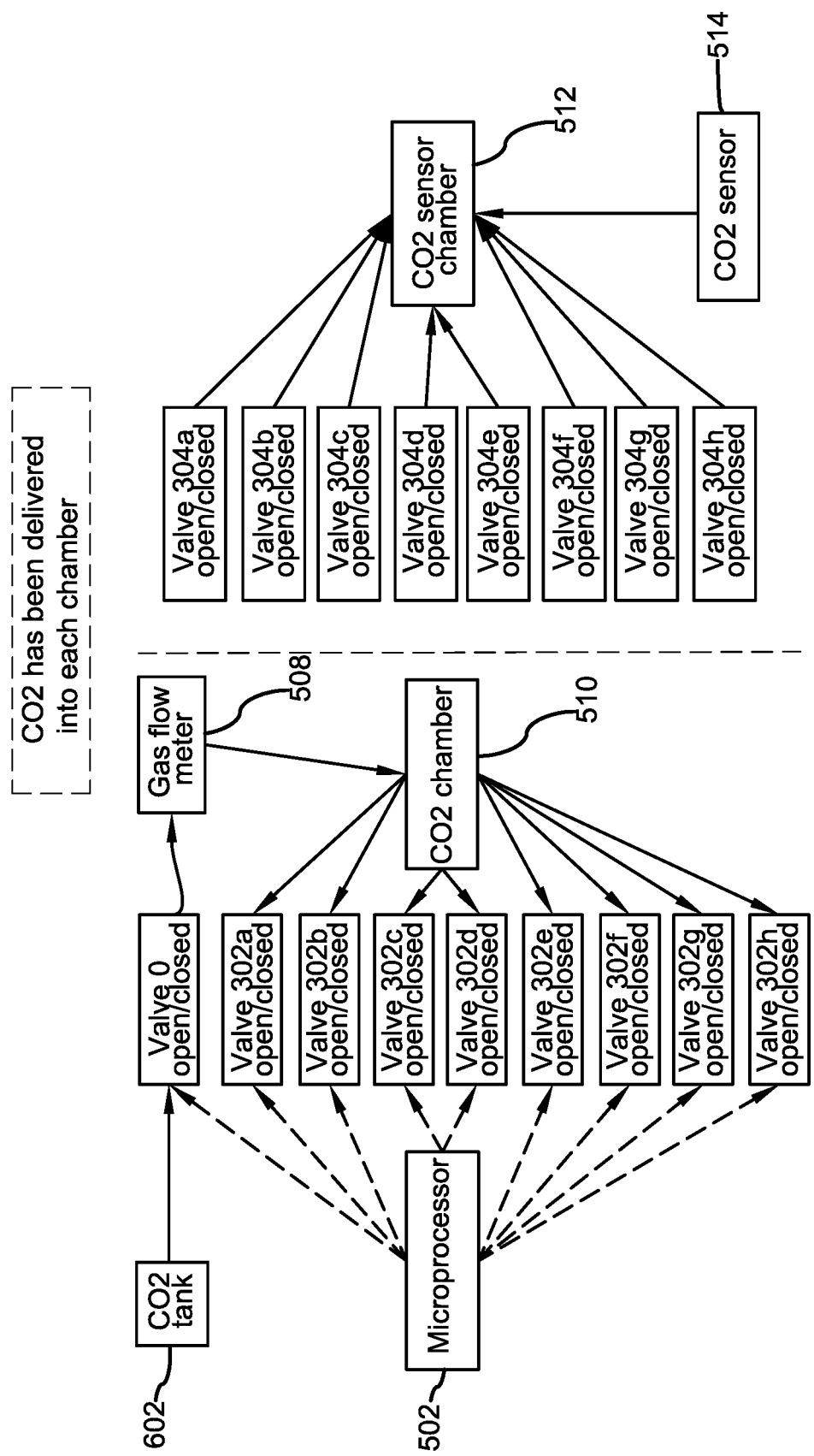
FIG. 7 illustrates a schematic view of the inflow and outflow of CO2 gas in the incubator system using the inlet valves and outlet valves in accordance with the disclosed architecture.

FIG. 7 illustrates a schematic view of the inflow and outflow of CO2 gas in the incubator system 100 using the inlet valves and outlet valves in accordance with the disclosed architecture. As illustrated, the CO2 tank 602 is connected to the gas flow meter 508 through the valve "v0" and CO2 flows to the meter 508. The flow meter 508 is coupled to the CO2 chamber 510 from which the CO2 flows to the trays through the valves 302a-h. The solenoid of individual valves is opened enabling flow of CO2 and when the CO2 flow is not required, the microprocessor 502 automatically closes the valves.

Once the CO2 is delivered to each tray of the incubator device 100, excess CO2 from each of the trays flows to the CO2 sensor chamber 512 through the outlet valves 304a-h. Based on the CO2 reading by the sensor 514 of the chamber 512, the microprocessor 502 either triggers the release, or halts the supply, of CO2 to the incubator system 100 to reach equilibrium and maintain the desired CO2 level in individual trays.

Figure 8:
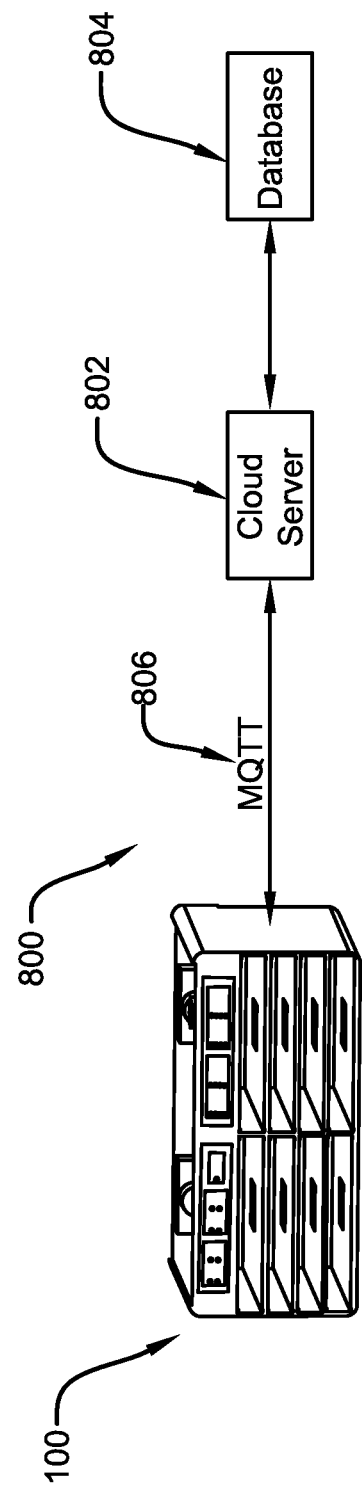
FIG. 8 illustrates a schematic view of a connection between the CO2 incubator device and a cloud server in accordance with the disclosed architecture.

FIG. 8 illustrates a schematic view of connection between the CO2 incubator device 100 and a cloud server 802 in accordance with the disclosed architecture. The cloud-based server 802 has an associated database 804 configured to store a plurality of data gathered from the microprocessor 502 within the incubator device 100. The data corresponds to individual incubator tray disposed in the device 100 and may include temperature, CO2 levels, humidity, and more. A timestamp is also associated with each entry of data enabling individuals to use those timestamps as reference points for data collection.

The cloud-based server 802 can be accessed by users, such as administration and researchers, using a dashboard accessible through a URL or a software implemented application. The server 802 is also configured to provide notifications, tools, and access rights to different users of the device. Further, the cloud-based server 802 can be configured to sync with a plurality of devices 100. The server 100 can also be used by an educator or other individuals to track students' progress while using the incubator device 100, and to troubleshoot internal conditions of the device 100. It should be appreciated that the server 802 enables users to remotely access, configure, and troubleshoot the firmware of the device 100.

For enabling transmission of data from the device 100 to the server 802, a compatible communication protocol is used. In the preferred embodiment, Message Queuing Telemetry Transport (MQTT) publish-subscribe messaging protocol 806 is used for exchanging data with the cloud-based server 802. The device 100 can be a part of any IoT based solution and monitoring system.

During communication, the device 100 acts as MQTT client and establishes an MQTT connection to the server 802. The device 100 publishes an API message containing the data over the MQTT connection 806 and then may receive a response to the API message. The device 100 also subscribes to the "Response" topic of the cloud server 802.

Other shapes, designs, and configurations of the incubator device 100 are contemplated and fall within the scope of the invention without affecting the utility of the system. Further, microcontroller and the microprocessor programmed via Python language.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "CO2 incubator device", "incubator device", "CO2 incubator system", "device", and "remotely controlled CO2 incubator device" are interchangeable and refer to the CO2 incubator device 100 of the present invention.

Notwithstanding the forgoing, the CO2 incubator device 100 of the present invention can be of any suitable size and configuration as is known in the art without affecting the overall concept of the invention, provided that it accomplishes the above stated objectives. One of ordinary skill in the art will appreciate that the CO2 incubator device 100 as shown in the FIGS. are for illustrative purposes only, and that many other sizes and shapes of the CO2 incubator device 100 are well within the scope of the present disclosure. Although the dimensions of the CO2 incubator device 100 important design parameters for user convenience, the CO2 incubator device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A CO2 incubator device comprising:
    an incubator device having a frame body and a plurality of modular incubation trays selectively removable from said frame body, wherein each of said plurality of modular incubation trays having an inlet control valve and an outlet control valve;
    a remote control for independently monitoring and independently controlling each of said plurality of modular incubation trays;
    wherein each of said plurality of modular incubation trays act as a separate incubator and individual bioreactor enabling said incubator device to be used by a plurality of researchers;
    wherein said incubator device is a CO2 incubator for providing contamination control and growing conditions for cell cultures;
    a sensor and a display device for displaying environmental conditions in each of said plurality of modular incubation trays;
    a heater positioned under each of said plurality of modular incubation trays, wherein each of said heaters adjusts a temperature of each of said plurality of modular incubation trays for providing optimum temperature for incubation; and
    further wherein said environmental conditions are selected from a group consisting of a CO2 level, a temperature, and an air pressure level.

2. The CO2 incubator device of claim 1, wherein each of said plurality of modular incubation trays comprise a latching front door for protecting items stored therein.

3. The CO2 incubator device of claim 2, wherein said latching front doors are transparent for viewing the items stored therein.

4. The CO2 incubator device of claim 3, wherein each of said plurality of modular incubation trays comprises a material selected from a group consisting of a stainless steel, a polycarbonate, and a copper.

5. The CO2 incubator device of claim 4, wherein each of said plurality of modular incubation trays are autoclavable.

6. The CO2 incubator device of claim 5, wherein said plurality of modular incubation trays comprise eight removable incubation trays.

7. The CO2 incubator device of claim 5, wherein each of said inlet control valves and each of said outlet control valves are one-way mechanically operated solenoid valves for providing unidirectional flow of the CO2 gas therethrough.

8. The CO2 incubator device of claim 7, further comprising a CO2 chamber for supplying said CO2 to each of said inlet valves.

9. The CO2 incubator device of claim 8, wherein said outlet valves expel CO2 out of each of said plurality of modular incubation trays.

10. The CO2 incubator device of claim 9, wherein said inlet control valve and said outlet control valve together maintain a level of CO2 gas in each of said plurality of modular incubation trays.

11. The CO2 incubator device of claim 10, wherein said level of CO2 gas is maintained at from about 3% to about 7%.

12. The CO2 incubator device of claim 11, wherein said sensor and said display device comprises a microprocessor and a microcontroller connected to said microprocessor for transmitting at least said temperature and said CO2 level in each of said plurality of modular incubator trays to said microprocessor.

13. The CO2 incubator device of claim 12, wherein said microcontroller comprises an embedded ADC chip for digitizing analog input signals for digital processing.

* * * * *